(12) United States Patent
Lei et al.

(10) Patent No.: US 7,865,540 B2
(45) Date of Patent: Jan. 4, 2011

(54) APPARATUS AND METHOD OF SEMANTIC-BASED PUBLISH-SUBSCRIBE SYSTEM

(75) Inventors: Hui Lei, Scarsdale, NY (US); Liangzhao Zeng, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 12/061,272

(22) Filed: Apr. 2, 2008

(65) Prior Publication Data

US 2008/0195591 A1 Aug. 14, 2008

(51) Int. Cl.
G06F 17/00 (2006.01)
(52) U.S. Cl. .............................. 707/999.103; 707/999.1; 707/999.102
(58) Field of Classification Search ............... 707/999.1, 707/999.103
See application file for complete search history.

(56) References Cited

U.S. PATENT DOCUMENTS

2004/0225629 A1* 11/2004 Eder ........................... 706/46
2006/0184473 A1* 8/2006 Eder ........................... 706/20
2006/0212487 A1* 9/2006 Kennis et al. ............... 707/200
2008/0082374 A1* 4/2008 Kennis et al. ................... 705/7

OTHER PUBLICATIONS

Y. Jin, et al., Relational Subscription Middleware for Internet-Scale Publish-Subscribe, Dept. of Computer Science, Stanford University, (2003).
M. Petrovic, et al., S-ToPSS: Semantic Toronto Publish/Subscribe System, Dept. of Electrical and Computer Engineering and Dept. of Computer Science University of Toronto, Canada, (2003).

* cited by examiner

Primary Examiner—Sana Al-Hashemi
(74) Attorney, Agent, or Firm—Whitham, Curtis, Christofferson & Cook, P.C.; Stephen C. Kaufman

(57) ABSTRACT

A semantic publish/subscribe system enables semantic event routing and allows publishers (resp. subscribers) to use self-defined event schemas to publish (resp. subscribe) events. The constraints on value-based publish/subscribe systems that publishers and subscribers must share the same event schemas are removed. With ontology support, the system conducts event correlation based on their semantics using relational operators. Event sources are searched for subscriptions and selected events are automatically correlated according to subscriptions. The system enables efficient semantic event routing by rewriting the subscription SQL statement, wherein no redundant events are generated.

11 Claims, 9 Drawing Sheets

SELECT * FROM $R_s$ ($A_{s1}, A_{s2}, ..., A_{sm}$) WHERE $C_s$

Figure 4

```
SELECT *
FROM Rs (Vehicle.SportCar, Insurance.CarInsurance,
         Finance.CarFinance)
WHERE Vehicle.SportCar.price.amount<5000 AND
      Vehicle.SportCar.price.currency='USD'
```

Figure 5

SELECT $A_{p1}, A_{p2}, \ldots, A_{pm}$ FROM $R_p$ WHERE $C'_s$

*Figure 6*

SELECT Vehicle.USSportCar, Finance.CarFinance, Insurance.CarInsurance
FROM $R_p$
WHERE Vehicle.USSportCar.price.amount<5000 AND Vehicle.USSportCar.price.currency='USD'

*Figure 7*

SELECT $A_{p1}, A_{p2}, \ldots, A_{pm}$
FROM $R_1, R_2, \ldots, R_n$
WHERE $C'_s$ AND $R_{p1}.A' = R_{p2}.A' = \ldots = R_{pn}.A'$

*Figure 8*

SELECT Vehicle.SportCar, Insurance.CarInsurance, Finance.CarFinance,
FROM $R_{p1}$(Vehicle.SportCar,Finance.CarFinance),
$R_{p2}$(Vehicle.SportCar,Insurance.CarInsurance)
WHERE Vehicle.SportCar.price.amount < 5000 AND Vehicle.SportCar.price.currency='USD' AND $R_{p1}$.SportCar= $R_{p2}$.SportCar

*Figure 9*

APPARATUS AND METHOD OF SEMANTIC-BASED PUBLISH-SUBSCRIBE SYSTEM

BACKGROUND OF THE INVENTION

1. Field of the Invention

The present invention generally relates to a publish/subscribe communication paradigm and, more particularly, to a semantic publish/subscribe system in which event providers can publish events according to self-defined event schema as they desire and event consumers are able to define subscription conditions based on self-defined event schemas of their own choice.

2. Background Description

The publish/subscribe system is a very active area of research and development (see, for example, M. K. Aguilera, R. E. Storm, D. C. Sturman, M. Astley, and T. D. Chandra, "Matching events in a content-based subscription system", *Symposium Principles of Distributed Computing*, pp. 53-61, 1999; Y. Jin and R. Strom, "Relational subscription middleware for internet-scale publish-subscribe", *2nd International Workshop on Distributed Event-based Systems*, San Diego, Calif., pages 1-8, 2003; and M. Petrovic, I. Burcea and H.-A. Jacobson, "S-ToPSS: Semantic toronto publish/subscribe system", *29th International Conference on Very Large Data Bases*, Berlin, Germany).

The publish/subscribe paradigm is a simple, easy to use and efficient approach for implementing communication among interconnecting applications. For example, publish/subscribe based middle-ware is currently being adopted in dynamic B2B (Business-to-Business) integrations for distributed business process integrations and management. Especially, it plays an important role in business activity management. The publish/subscribe system contains three roles: (i) event providers (i.e., publishers), who provide the event information, (ii) event consumers (i.e., subscribers), who subscribe to the particular interested events, and (iii) the event broker, who is responsible for routing the events from the publishers to the subscribers.

The earliest publish/subscribe systems were topic-based. In these systems, a set of topic spaces is pre-defined. Each event is labeled as one of a fixed set of topics. The providers are required to specify which topic that an event belongs to. When consumers subscribe to a particular topic, they will receive all the events that are labeled with that topic. In the past decade, systems supporting this paradigm have matured significantly resulting in several solutions. A similar approach has been adopted by the OMG for CORBA event channels (event services). However, such systems are limited on customized event brokering. For example, when information consumers subscribe to events belonging to the topic Vehicle, any event labeled with Vehicle will be delivered to the consumer, regardless of the content of the event.

In consequence, as an improvement to topic-based solution, content-based publish/subscribe systems are proposed (see Arguilera et al., ibid.). Instead of a set of topic, these systems support a number of information spaces, where each space associated with an event schema that de nes the syntax of event. The vehicle dealer example may be defined as an information space (i.e., event schema) contains three attributes (String issue, Dollar price, Integer door). A subscription is then a predicate over these attributes, such as (issue="Sporty Car") AND (price>40K) AND (Door#==2). In this way, content-based publish/subscribe systems allow subscribers to have the flexibility of choosing filtering criteria along multiple dimensions.

A further development of content-based publish/subscribe system is to support relational subscriptions (see Jin et al., ibid.), which enables subscribers explicitly specify the event sources and correlated them using relational operators. However, above three types of publish/subscribe systems assume that the event publishers and subscribers adopt same approaches to organize information spaces. Further, the event routing in these systems is based on value of events. Therefore, we argue that these publish/subscribe systems are not sufficient for applications in dynamic environments. For example, in dynamic B2B integration, an application may need to interact with a heterogeneous and highly dynamic collection of both new and legacy partner applications. The information exchange among the applications is typically realized by publishing and subscription events on an event bus. If the event bus adopts relational publish/subscribe system, then applications need to instruct the publish/subscribe system on how to correlate events based on availability of event sources. This requires an application to be aware of all the event schemas that are used by its partner applications. Such a requirement is impractical when the application has a dynamic collection of partner applications, which is the case of dynamic B2B integrations. Therefore, applications in dynamic B2B integrations become easier to be developed and maintained if the event publication and subscription can be based on self-defined event schemas, as well as event semantic transformation and correlation can be provided as part of publish/subscribe in system level and transparent to applications.

An initial effort to provide semantic support for event routing is given by Petrovic et al. (ibid.) which relaxed the constraints of content-based publish/subscribe that publishers and subscribers must share the same event schemas. However, this approach only considered semantic routing from one event source to subscriptions. Further, the semantic event routing of Petrovic et al. is enabled by term generating; i.e., generating more generic events based on published events, which creates redundant information.

Similar to publish/subscribe systems, continual queries (see L. Liu, C. Pu and W. Tang, "Continual queries for internet scale event-driven information delivery", *IEEE Knowledge and Data Engineering*, 11(4):610-628, 1999) also focus on push-enabled, event-driven and content-sensitive information delivery. In openCQ described by Liu et al., the event models are either system predefined or user defined. In the case of user defined event models, they need to be registered into the system first. Again, the information delivery is based on value-based matching, without consideration of semantic matching. OpenCQ requires information consumers to explicitly specify the query statement based on available information sources, which is similar to a relational publish/subscribe system.

SUMMARY OF THE INVENTION

It is therefore an object of the present invention to provide a semantic publish/subscribe system which enables semantic event routing and allows publishers (resp. subscribers) to use self-defined event schemas to publish (resp. subscribe) events.

According to the invention, the constraints on value-based publish/subscribe systems that publishers and subscribers must share the same event schemas are removed. Different from relational publish/subscribe systems the event correlation in the subject invention is transparent to subscribers. The significant contributions of this invention include the following:

1. Semantic-based, automatic event correlation for subscriptions. With ontology support, it is possible for the system to conduct event correlation based on their semantics using relational operators. For example, two published events can be correlated using a join operator and delivered to event consumers. We develop a mechanism that can automatically search event sources for subscriptions and correlate selected events according to subscriptions.
2. Efficient semantic event routing. A native approach to enabling semantic event routing is termed re-writing, which generating more generic events using published event based on ontologies. For example, from an event about 'sports car', the system can generate a more generic event about 'car'. Such an approach is clearly very inefficient, since it generates unnecessary redundant events. In our framework, instead of adopting native approach which requires term generation, the system enables semantic event routing by re-writing the subscription SQL (Structured Query Language) statement, without generating any redundant events.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a subscription SQL statement;

FIG. 5 is an example of a subscription SQL statement;

FIG. 6 is a re-written subscription SQL statement based on a sufficient event source;

FIG. 7 is an example of a re-written subscription SQL statement based on a sufficient event source;

FIG. 8 is a re-written subscription SQL statement;

FIG. 9 is an example of a re-written SQL statement based on a correlated event source;

DETAILED DESCRIPTION OF A PREFERRED EMBODIMENT OF THE INVENTION

System Architecture

Figure 1:
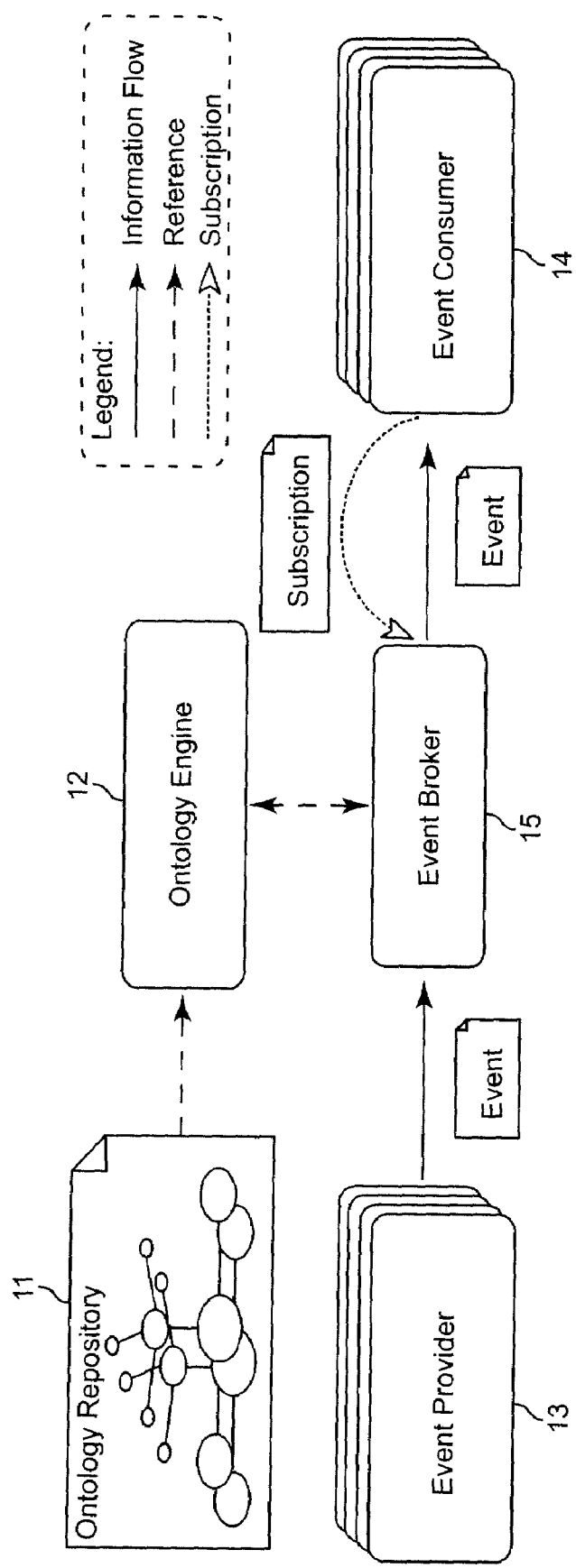
FIG. 1 is a block diagram of the semantic publish/subscribe system architecture according to the invention.

Referring now to the drawings, and more particularly to FIG. 1, there is shown the system architecture of the semantic publish/subscribe system. The publish/subscribe system consists of an ontology repository 11, an ontology engine 12, event providers 13, event consumers 14 and an event broker 15. An ontology typically consists of hierarchical description of important concepts (i.e., vocabularies) in a domain, along with descriptions of the properties of each concept, and the relationships between concepts. Ontologies play a pivotal role in understanding the semantics, or meaning, of event data. When event providers 13 publish events, they can use self-defined event schemas as their own choice. On the other hand, when event consumers 14 subscribe to events, they can also use their own desirable self-defined event schemas, where the subscriptions can be modeled as SQL (Structured Query Language) statements. By querying the ontology engine 12, the event broker 15 identifies event sources for subscriptions and rewrites SQL statements to bridge the semantic difference between published events and information required by subscriptions. When an event is published, the event broker 15 routes the event based on rewritten SQL statement.

Ontology

In our system, we adopt an object-oriented approach to de ne the ontology, in which the type is defined in terms of classes. An instance of a class is considered as an object. The formal description of class and object are given as follows.

Definition 1 (Class). A class C is defined as the tuple C=<N, S, P, R, F>, where N is the name of the class;

S is a set of synonyms for the name of class, $S=\{s_1, s_2, \ldots, s_n\}$;

P is a set of properties, $P=\{p_1, p_2, \ldots, p_n\}$. For $p_i \in P$, $p_i$ is a 2-tuple in form of $<T, N_p>$, where T is a basic type such as integer, or a class in an ontology, Np is the property name.

R is a set of parent classes, $R=\{C_1, C_2, \ldots, C_k\}$;

F is a set of dependence functions for the properties, $F=\{f_1, f_2, \ldots, f_l\}$. Each function is in form of $p_i=f_j(p_1, p_2, \ldots, p_m)$ and associated with a predicate c, where $p_i$ is a property from a class other than C and the predicate c is used to correlate $p_i$.

In the definition of class, the name, synonyms and properties present the connotation of a class; while parent classes and dependence functions specify relationships among the classes, i.e., present the denotation of a class.

Figure 2:
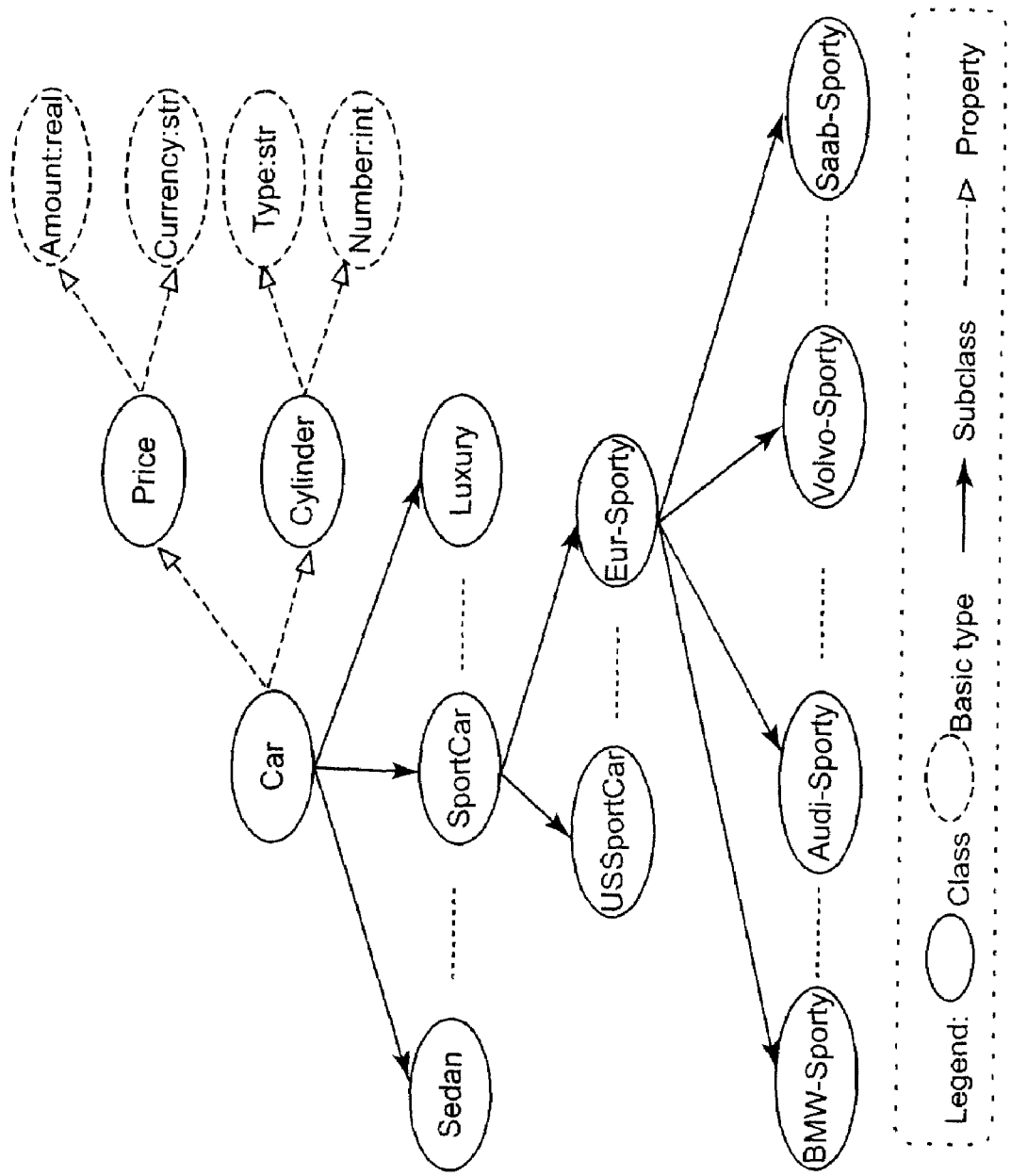
FIG. 2 is a simplified view of the vehicle ontology used by way of example in the description of the invention.

A class may have parent classes for which it inherits attributes. For example, class Sport Car's parent class is Car, so the class Sport Car inherits all the attributes in class Car. Based on the inheritance relationship among the class, we can define a class inheritance graph as the directed graph $G=(V, E)$ where vertices in V present classes and an edge $(C_i, C_j)$ exists in E if $C_j$ is the parent of $C_i$. We say $C_i$ is a subclass of $C_j$ if there existing a path form $C_i$ to $C_j$ in E. Conversely $C_j$ is a superclass of $C_i$ if a path from $C_i$ to $C_j$ exists. It should be noted that an ontology consists of a collection of hierarchical classes according to the inheritance relationship. An example of ontology can be found in FIG. 2.

Other than inheritance relationships, difference classes may have value dependence on their properties. In our framework, dependence functions are used to indicate the value dependence among the different classes' properties. For example, we have three classes ShippingDuration, ShippingArrival and ShippingDeparture. In ShippingDuration, the attribute duration has a dependence function defined as duration=minus(ShippingArrival.timeStamp, ShippingDeparture.timeStamp), where the predicate is

| | |
|---|---|
| ShippingDuration.shippingID | == ShippingArrival.shippingID |
| | == ShippingDeparture.shippingID. |

Figure 3:
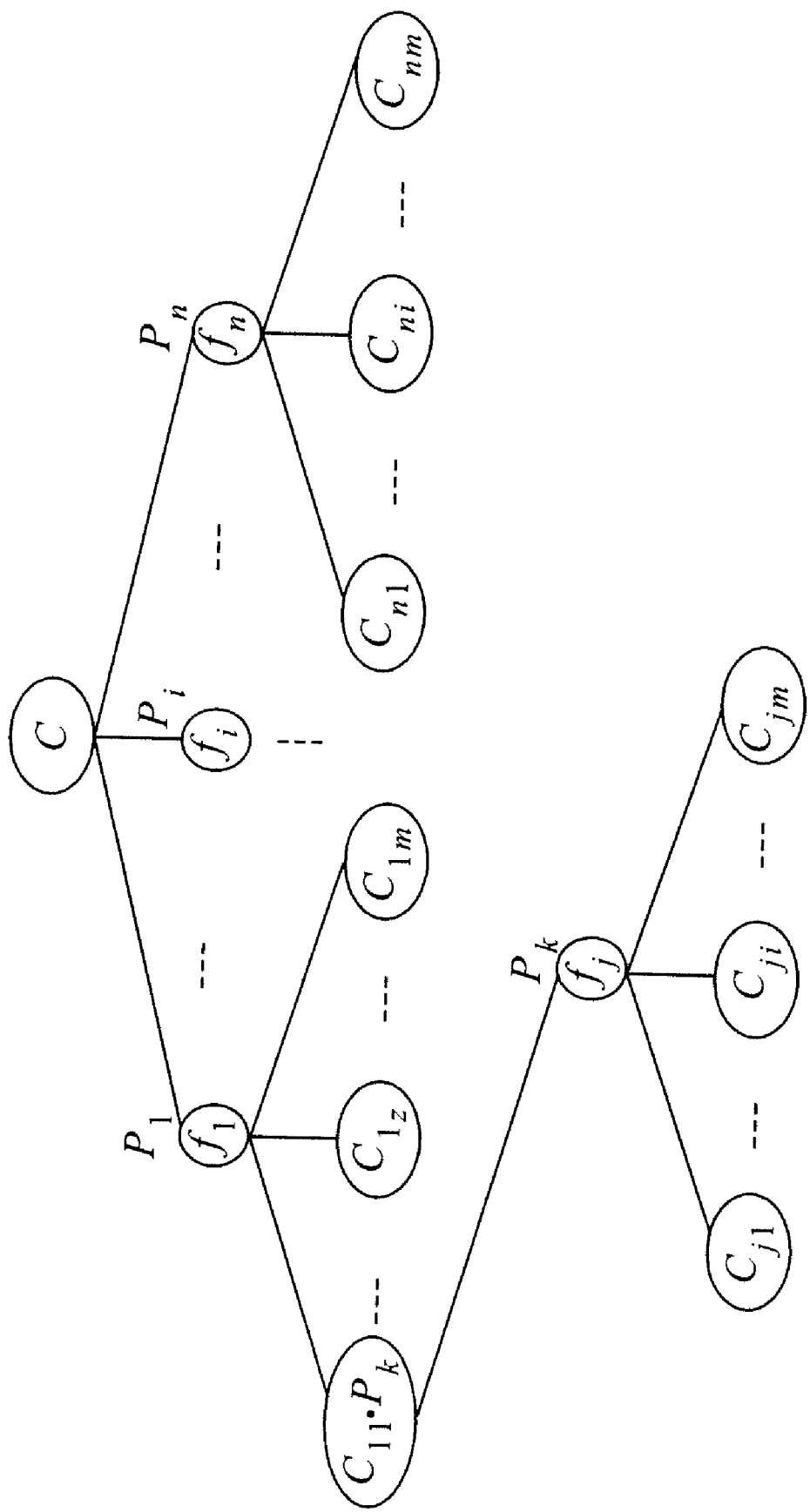
FIG. 3 is a diagram of a dependence tree of the class C.

Based on dependence functions, a dependence tree can be constructed for each class. Assuming that the class C has a set of dependence functions F, then a dependence tree can be generated as FIG. 3. There are three kind of nodes in a dependence tree, namely class node, operator node and depended class node. It should be noted that the depended class node may also have its own dependence tree (e.g., $C_{11}$). A property's complete dependence set is defined as a collection of depended classes that can be used to calculate the value of the property. For example, the set $\{C_{11}, C_{12}, \ldots, C_{1m}\}$ is a complete dependence set of the class C's properties. By replacing the $C_{11}$ with its own complete dependence set $\{C_{j1}, \ldots, C_{jm}\}$, we can have another complete dependence set for the class C as $\{C_{j1}, \ldots, Cjm, C_{12} \ldots, C_{1m}\}$.

An object is an instance of a class. The formal definition of an object is given in Definition 2. Here the ID in the definition is the attribute provides universal identification for an object.

Definition 2 (Object). An object O is a 3-tuple <ID, $N_c$, V>, O is an instance of a class C, where
 ID is the id of the object;
 $N_c$ is the class name of C;
 V=$\{v_1, v_2, \ldots, v_n\}$, is the attribute value according to the attributes of the class C. For $v_i \in V$, $v_i$ is a 2-tuple in form of <$N_p$, $V_p$>, where $N_p$ is the property name, $V_p$ is the property value.

Event Publication/Subscription

In our framework, when publishing events, publishers can use ontologies to define their own event schemas. The definition of an event schema is similar to the relation schema in relational database, which is denoted as $R_p(A_1, A_2, \ldots, A_n)$ and each attribute in the schema is a class in an ontology. An event is an instance of an event schema, denoted as e<$v_1$, $v_2, \ldots, v_n$>, where each value $v_i$, $1 \leq i \leq n$, is an object of class $A_i$ or a special null value. It should be noted that event schema may associate with a set of constraints such as primary key, foreign key or check constraint. An example of event schema can be $R_p$(Vehicle.Sporty, Insurance.CarInsurance, Finance.CarFinance), where the Vehicle.Sporty is a primary key.

For the event subscribers, the event subscription consists of two elements: an event schema $R_s$ and an event subscription condition $c_s$. The event schema is specified in the same way as publishers' event schema. An event subscription can be modeled as a SQL query (see FIG. 4) on a relation. In FIG. 4, $A_{si}$ ($1 \leq i \leq m$) is an attribute in event schema $R_s$, and $c_s$ is the subscription condition on the attributes on $R_s$. An example of subscription SQL statement is given in FIG. 5.

In this description, we assume that both publishers and subscribers use the same ontology for a domain. If a publisher and a subscriber use different ontologies for a domain, e.g., $O_p$ and $O_s$ respectively, then based on mapping between the $O_p$ and $O_s$, we can have $O_c$ which is common ontology for both publisher and subscriber.

Routing Event from Single Event Source

We now discuss the case when a single event sources can provide sufficient information that required by a subscription, where such a single event source can be either: (i) provides more information than required by subscription, i.e., a published event schema have more attributes than required by the subscription, or (ii) provides more specific information than required by the subscription. In the following subsections, we first discuss how to determine whether an event source is sufficient for a subscription, and then give details on event routing.

Searching Sufficient Event Source for Subscription

Before getting into details about sufficient event source, we discuss attribute matching first. Assuming there are two event schemas $R_1$ and $R_2$, the attribute in $R_1$ (resp. $R_2$) is a set $\mathcal{A}_1$ (resp. $\mathcal{A}_2$). For an attribute $A_i$ in event schema $R_1$ (i.e., $A_i \in \mathcal{A}_1$), we say $A_i \in \mathcal{A}_2$, if $\exists A_j \in \mathcal{A}_2$, and either (i) $A_i$'s class type is the same as $A_j$'s class type (same name or synonym in an ontology), or (ii) $A_i$'s class type is a superclass of $A_j$'s class type.

A sufficient event source is a single event source that contains all the necessary attributes (can be more specific attributes) that are required by a subscription. For example, for a subscription S in FIG. 5, subscription event schema is $R_s$(Vehicle.SportCar, Insurance.CarInsurance, Finance.CarFinance). The published schema $R_p$(Vehicle.USSportCar, Insurance.CarInsurance, Finance.CarFinance) can provide all the attributed in $R_s$ since Vehicle.USSportCar "is a" Vehicle.SportCar. Therefore, $R_p$ is a sufficient event source of a subscription S. The formal definition of sufficient event source is given as follows:

Definition 3 (Sufficient Event Source). Rp is a published event schema where the attribute set is $\mathcal{A}p$; Rs is the event schema of a subscription Swhere the attribute set is $\mathcal{A}s$. Rp is a sufficient event source for Sif:

$\forall A_i \in Rs, A_i \in \mathcal{A}_p$.

It should be noted that searching sufficient event sources for a subscription can be done by testing each available published event schemas using the condition given in the Definition 3.

Rewriting SQL Statement Based on Sufficient Event Source

In most cases, the event broker needs to rewrite the subscription SQL statement according to sufficient event source, except that the sufficient event source is defined is exactly the same as specified in subscription, i.e., $R_p = R_s$. If the event source is a sufficient published event schema $R_p$, then the SQL statement shown in FIG. 5 can be rewritten as shown in FIG. 6. In the select clause, each $A_{pi}$ is an attribute in a published event schema, and $A_{pi}$ is either the same as $A_{si}$ or a subclass of $A_{si}$. In the from clause, $R_p$ is replaced by the sufficient event source $R_s$. In the where clause, $c_s$ can be obtained by replacing $A_{si}$ with $A_{p1}$. For example, the subscription SQL statement in FIG. 6, given the sufficient published event schema $R_p$(Vehicle.USSportCar, Finance.CarFinance, Insurance.CarInsurance), can be re-written as shown in FIG. 7.

Correlating Events from Multiple Event Sources

As we discussed earlier, the required information of subscriptions can also be correlated from a set of event sources, where each individual event source can provide partial information required by subscription. In the following subsections, we first present how to search a collection of event sources that is correlatable and provide sufficient information to subscriptions, then give the details on event correlation and semantic event routing.

Searching Correlatable Event Sources for Subscription

In our framework, multiple published events can be correlated to satisfy an event subscription, where the correlation can be done by join operators based on primary/foreign keys constraints and/or attribute dependence functions.

Locating Key-Based Correlation Source

Definition 4 (Key-based Correlation Source). $\mathcal{R}_p$ ($\mathcal{R}_p=\{R_1, R_2,\ldots,R_n\}$) is a set of published event schema, $\forall R_i \in \mathcal{R}_p$, $R_i$'s attribute set is $\mathcal{A}_i$ and $\mathcal{A}_p=\cup_{i=1}^{n} \mathcal{A}_n$; $R_s$ is the event schema of the subscription S, the attribute set is $\mathcal{A}$. $\mathcal{R}_p$ is a Key-based Correlation Source of S if:
1. $\forall A \in Rs, A \in R_p$;
2. $\forall \mathcal{A}_i$, $(\mathcal{A}_i-(\cup_{j=1}^{i-1}\mathcal{A}_j \mathcal{R} \cup_{j=i+1}^{n}\mathcal{A}_j)) \cap As \neq \emptyset$;
3. if $\mathcal{A}'=\cup_{i=1}^{n}\mathcal{A}_i$, then $\mathcal{A}' \neq \emptyset$; and $\exists A' \in \mathcal{A}'$, $\forall R_i \in S_p$, A' is either primary key or foreign key in $R_i$.

In this definition, three conditions need to be satisfied for considering a set of event schemas as a correlation event source for a subscription: Item (1) in definition indicate all the attributes required in subscription can be found in at least one of event sources, which is a necessary condition of the definition. Item (2) indicates any published event schema in correlation event source contributes at least one unique attribute for the subscription. Item (3) indicates all the published event schemas are correlation event source are correlatable by primary/foreign key constraints. Using the above example, $R_{p1}$ (resp. $R_{p2}$) provides a unique attribute Insurance.CarInsurance (resp. Finance.CarFinance). Correlation result of $R_{p1}$ and $R_{p2}$ provides sufficient information for the subscription. It should be noted that items (2) and (3) are the sufficient conditions for the definition.

Searching correlation event sources for a subscription can be modeled as a schema selection problem. Assume that event schema in subscription is $R_s(A_1, A_2,\ldots,A_m)$. For each attribute $A_i$, the event broker searches any published event schemas that contains attribute $A_i$ and have at least two attributes. The search result is a set of published event schemas $\mathcal{R}$. After finishing the searching for each attribute $A_i$ in $R_s$, the event broker gets a set of 2-tuples W:

$$W=\{<\mathcal{R}_1,A_1>,<\mathcal{R}_2,A_2>,\ldots,<\mathcal{R}_n,A_n>\} \quad (1)$$

In equation (1), the set Ri represents candidate published event schemas that contain at least one attribute in subscription event schema (i.e., $\mathcal{R}_i \neq \emptyset$). By selecting one published event schema from each $\mathcal{R}$, we can have a set of published event schema sets that are denoted as:

$$R=\{\mathcal{R}'_1,\mathcal{R}'_2,\ldots,\mathcal{R}'_m\} \quad (2)$$

where $\mathcal{R}'i$ is a published event schema set that can satisfy condition (1) in Definition 4. By testing each $\mathcal{R}'_i$ using items (2) and (3) in Definition 4, we have all the possible key-based correlation sources for a subscription, which can be denoted as:

$$R_c=\{\mathcal{R}_{c1},\mathcal{R}_{c2},\ldots,\mathcal{R}_{cn}\}. \quad (3)$$

Correlating Events Based on Attribute Dependence Functions

Other than key-based, the correlation can also be realized based on dependence functions. Assume an attribute $A_i(A_i \in R_s)$ and the class type (denoted as $C_i$) of attribute $A_i$ has any dependence function for each property in $C_i$. Since $A_i$'s each property's value can be computed based on its dependence set, the event broker can correlate the events that contribute elements in the dependence set to compute the value of subscripted attribute $A_i$'s properties' value. For example, assume the attribute ShippingDuration is required by subscription but not provided by any published event schemas; however, ShippingDuration's property duration is associated as a dependence function and the dependence set is {ShippingDeparture, ShippingArrival}. So, the system can search published schema that contain ShippingDeparture and/or ShippingArrival and correlate related events to compute the value for ShippingDuration.

In the following, we first give the formal definition of Attribute-dependence Correlation Source and then discuss the algorithms for searching such sources for a subscription.

Definition 5 (Attribute-dependence Correlation Source). $\mathcal{R}_p=\{R_1, R_2,\ldots,R_n\}$. $\mathcal{R}_p$ is a set of published event schema, $\forall R_i \in \mathcal{A}_p$, $R_i$'s attribute set is $\mathcal{A}_i$ and $\mathcal{A}_p=\cup_{i=1}^{n}\mathcal{R}_i$; $R_s$ is the event schema of the subscription S, the attribute set is $\mathcal{R}_i$, $\mathcal{A}_p$ is an Attribute-dependence Correlation Source of the subscription S if:
1. $\exists A \in \mathcal{A}_s$, if $A \notin \mathcal{A}_p$, then $\mathcal{A}_p$ contains a complete dependence set for each property in A;
2. $\forall \mathcal{A}_i$, $(\mathcal{A}-(\cup_{j=1}^{i-1}\mathcal{A}_j \cup \cup_{j=i=1}^{n}\mathcal{A})) \cap \mathcal{A}_s \neq \emptyset$;
3. if $\mathcal{A}' \neq \square_{i=t}^{n}\mathcal{A}_i$, then $\mathcal{A}' \neq \emptyset$; and $\exists A' \in \mathcal{A}'$, $\forall R_i \in \mathcal{R}_p$, A' is either primary key or foreign key in $R_i$.

In the above definition, different from the key-based correlation source, an attribute may not appear in any published event schema; however, its properties can be computed using dependence functions based on a computed dependence set (see Definition 2). The same as searching a key-based correlation source, searching attribute-dependence sources is also modeled as a schema selection problem. However, the assumption of $\mathcal{R}_i \neq \emptyset$ does not hold for all the $A_i$ in this case. Therefore, for these $A_i$, we can search whether existing published schemas that can cover all the attributes that are specified in a completed dependence set. Again, all published schemas need to satisfy the sufficient conditions as shown in items (2) and (3) of the definition.

Rewriting SQL Statement Based on Correlation Event Sources

When correlated event sources are identified, the correlation can be realized by rewriting the SQL statement on correlation event sources. If the event source is a key-based correlation source, then the SQL statement can be rewritten as shown in FIG. 8, where we assume that A' is either primary key or foreign key in $R_{pi}$. In the select clause, each $A_{pi}$ is an attribute in the published event schema, and $A_{pi}$ is either the same as $A_{si}$ or a subclass of $A_{si}$. In the case of an attribute-dependence correlation source, the $A_{si}$ needs to be replaced by the left hand side of the function. In the from clause, $R_s$ are replaced by the all the element event schema in the correlation sources. In the where clause, $c_s$ can be obtained by replacing $A_{si}$ with $A_{p1}$ in $c_s$. For example, the subscription SQL statement shown in FIG. 6, given the correlation event source $\mathcal{R}_p=\{R_{p1}(\text{Vehicle.Sporty, Insurance.CarInsurance}), Rp2(\text{Vehicle.Sporty, Insurance.CarFinance})\}$, can be re-written as shown in FIG. 9. It should be noted that in case the event sources are correlated based attribute-dependence, the SQL statement re-writing is similar to the key based in both the select and the from clauses. The where clause is slightly different; other than the equal join condition, the predicate in attribute dependence function needs to be added.

Implementation

Figure 10:
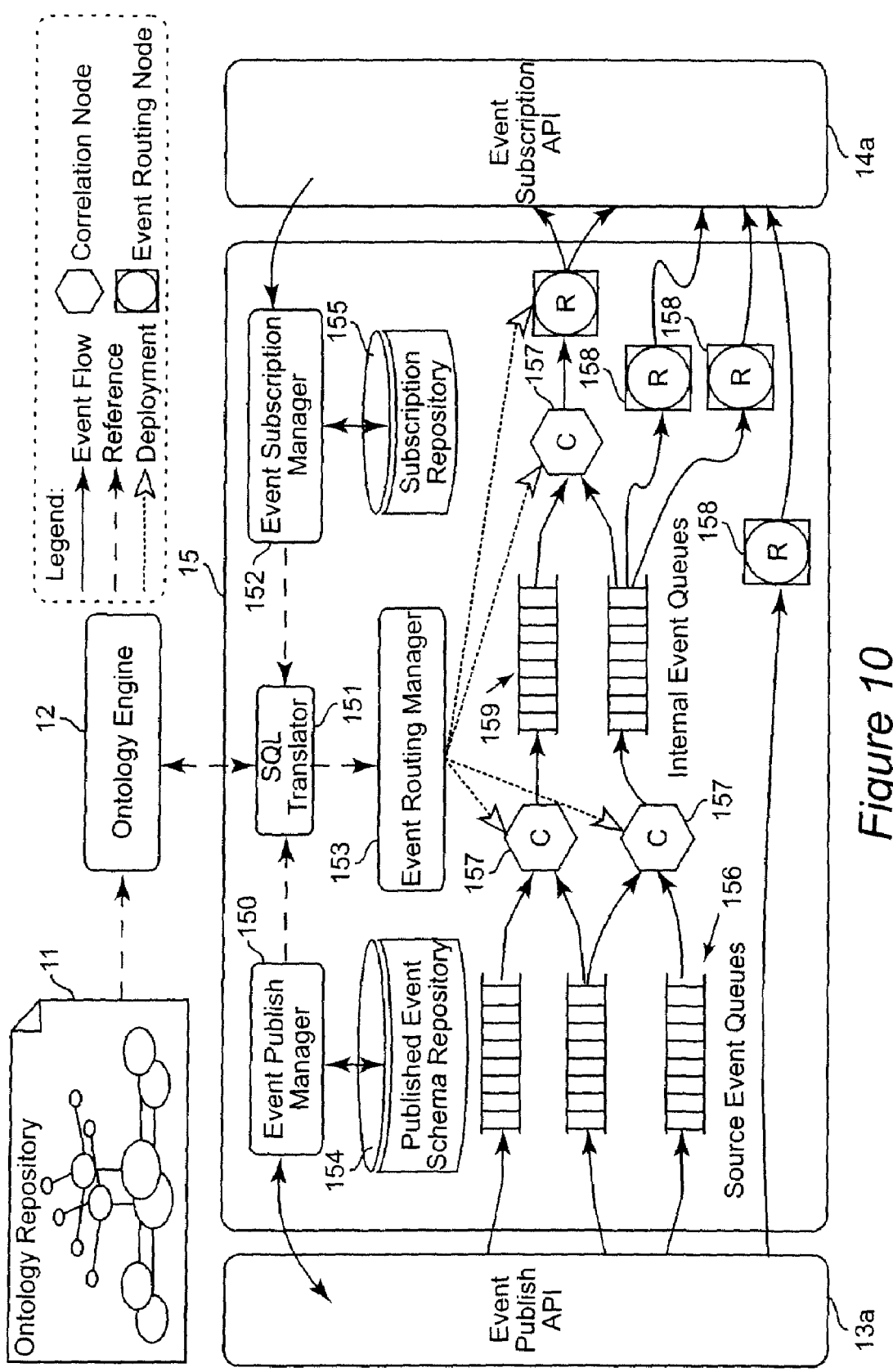
FIG. 10 is a block diagram of the system architecture of an event broker according to the invention.

The implementation of the event broker 15 is shown in FIG. 10. The event broker enables semantic publish/subscribe and comprises of an event publish manager 150, an SQL translator 151, a subscription manager 152 and an event routing manager 153. It provides event publish and event subscription APIs (Application Program Interfaces) 13a and 14a, respectively. The event schemas that are used to publish events are stored in a publish schema repository 154, while the event schemas that are used to subscribe are stored in a subscription schema repository 155.

The event broker manages a source event queue 156 for each published event schema for any correlation event sources. Here, the queue 156 provides persistence storage for the events in order to be correlated statements based on selected event sources. The re-written SQL statement is deployed into the event routing manager 153. The event routing manager 153 creates correlation nodes 157, event routing nodes 158 and internal event queues 159. The correlation nodes 157 execute join and project operators to correlate event sources. The event routing nodes 158 are used to route the interested information by subscriptions. In order to improve efficiency, the internal event queues 159 are used to store the intermediate event processing result so that both kinds of nodes can be shared by different subscriptions.

At runtime, when an event e is published, if e's event schema belongs to an existing published event schema R, the event broker may need to update the content of the event queue maintained by the event broker. Assuming that there is a primary key constraint in R on attributed A, the event broker 15 needs to check whether the events in queue need to be replaced. For example, the value of a new event on attribute A is v. If there is an event $e_i$ in the event queue, where $e \cdot A=v$, then the event $e_i$ needs to be replaced by e. After the event queue is updated, for any subscriptions that the event sources contain R, the associated re-written SQL statement needs to be executed and the execution results delivered to the corresponding event subscribers.

In the case that e's event schema R is new to the event broker 15 (i.e., $R \not\in R_c$) the event broker 15 needs to check whether it can be an event source for any subscription. Assume that the new event's event schema is R and $R \not\in R_c$ ($R_c$ is the set for currently existing published even schemas in the event broker). Therefore, the event broker 15 needs to scan all the subscriptions first, then check whether the R can be sufficient or a part of correlation (with existing published event schemas) event source of any existing subscriptions. If a new event source (either sufficient or correlated) is identified, then the new subscription SQL statement can be generated based on R as we discussed earlier. Before executing the SQL statement, the event broker will allocate a new event queue to store the event.

The semantic publish/subscribe system of this invention is another step forward in development of publish/subscribe systems. The invention considers not only a single event source for subscriptions, but also automatically correlates multiple events using relational operators based on required information of subscriptions. Different from relational publish/subscribe systems, the event correlation of the invention is transparent to subscribers and enables dynamic B2B integrations.

Figure 11:
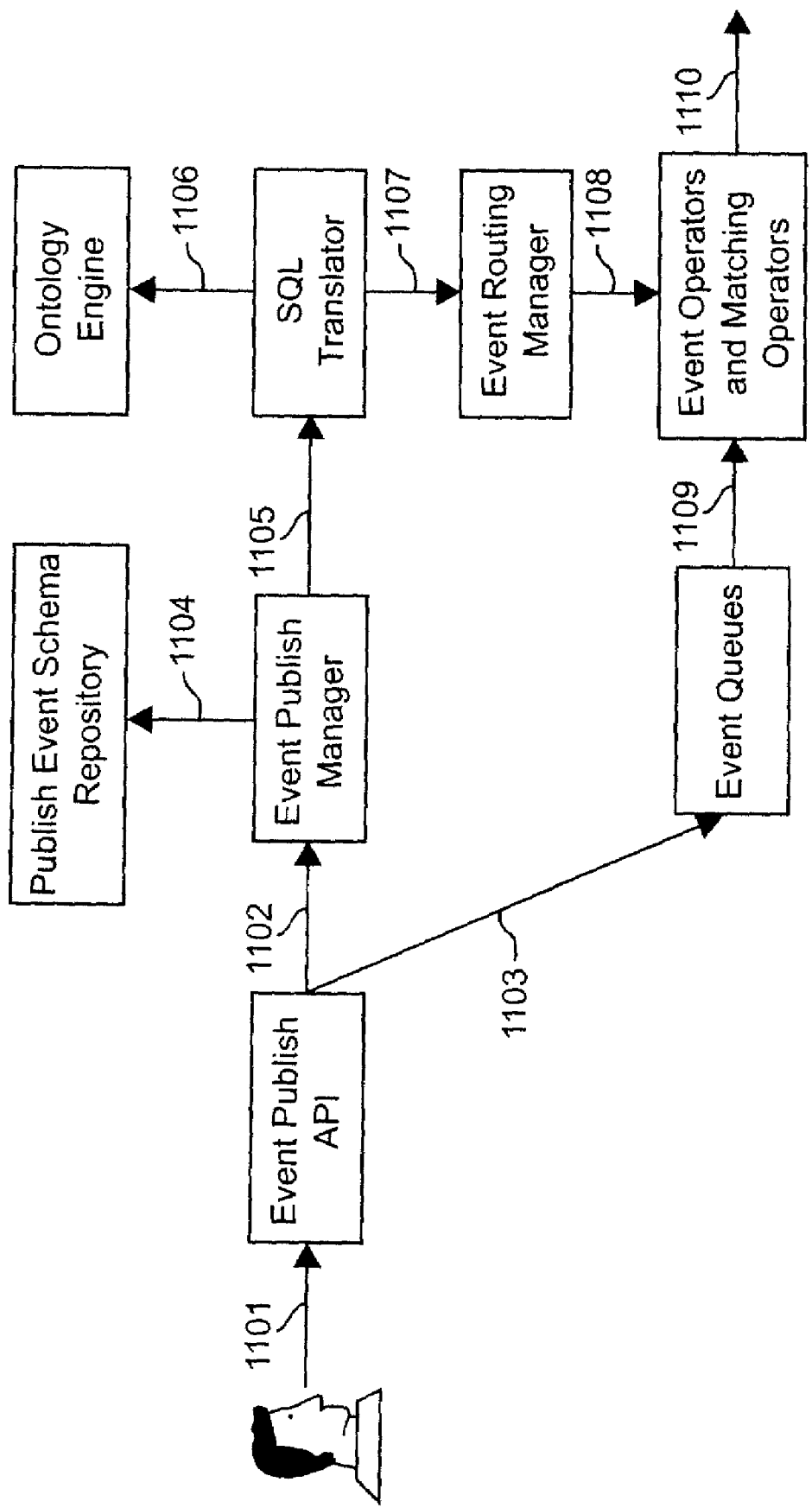
FIG. 11 is a flow diagram illustrating how even publishers publish events in the system.

FIG. 11 shows the various steps of the system in FIG. 10 taken to publish events in the system. When event publishers 1101 use the Event Publish API 13a to publish events to the Event Publish Manager 150, the Event Schema is delivered to the Event Publish Manager (Step 1102) and the event tuple is delivered into Event Queues 156 (Step 1103). On the one hand, event tuples in the Event Queues 156 are funneled to Event Operators and Event Matching Operators (Step 1109). On the other hand, when the Event Publish Manager 150 receives an Event Schema, it first consults (Step 1104) the Published Event Schema Repository 154. If the published Event Schema is new, i.e., it is not in the Published Event Schema Repository, then the Event Schema needs to be funneled to the SQL Translator 151 (Step 1105). When the SQL Translator receives a new Event Schema, it consults Ontology Engine 12 (Step 1106), rewrites the subscription statements and deploys the rewritten SQL statements into the Event Routing Manager 153 (Step 1107). The Event Routing Manager 153 creates new Event Operators or Event Matching Operators (Step 1108) in order to correlate or match event tuples for delivering events to subscribers (Step 1110).

Figure 12:
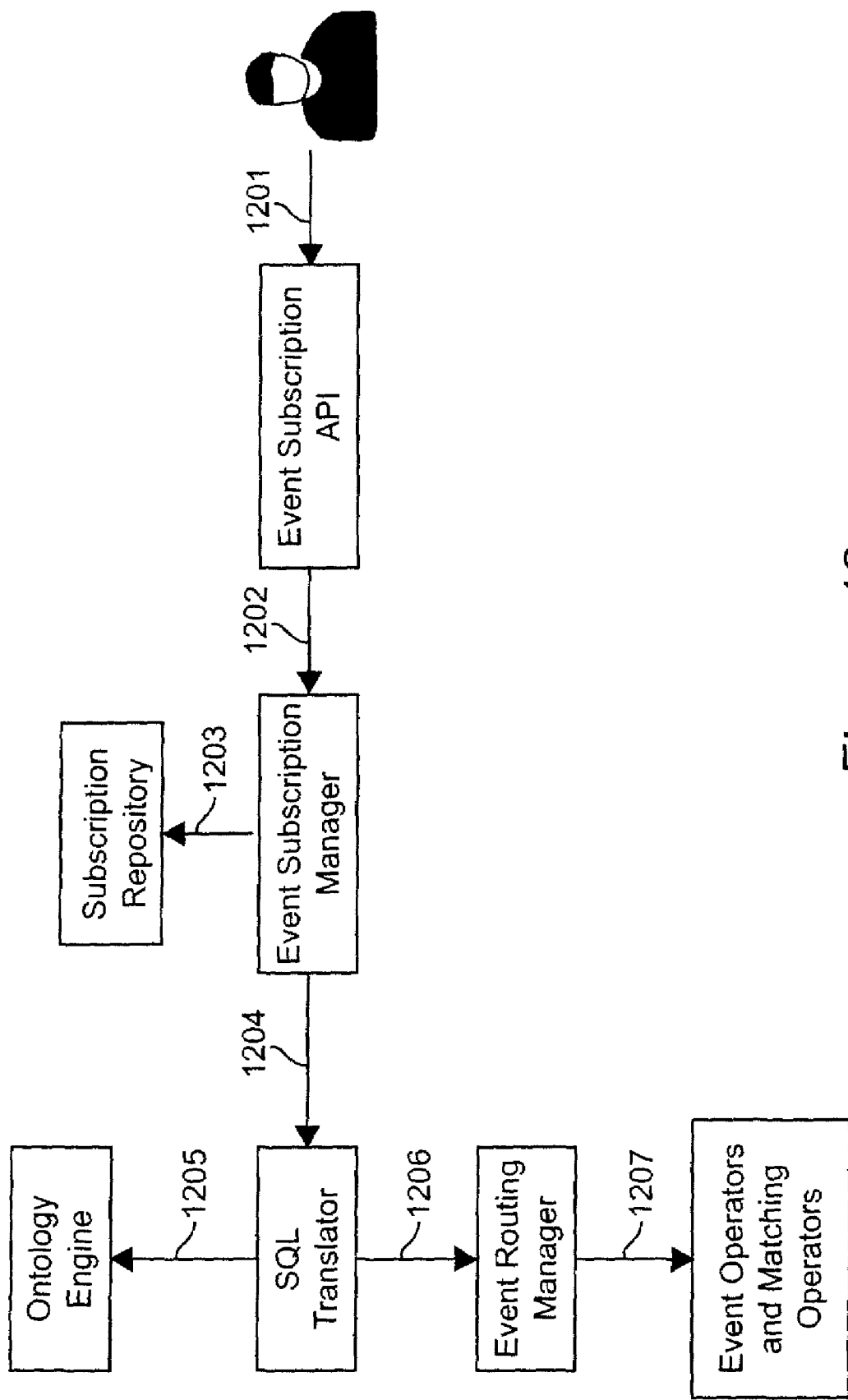
FIG. 12 is a flow diagram illustrating how even subscribers subscribe events in the system.

FIG. 12 shows the various steps of the system in FIG. 10 taken to subscribe to events in the system. Event subscribers 1201 use the Event Subscription API 14a to subscribe to events from the Event Subscription Manager 152 (Step 1202). When receiving an Event Subscription, the Event Subscription Manager 152 consults the Subscription Repository 155 (Step 1203) to check whether it is a new subscription (either the subscription schema and subscription condition) and funnels the subscription to the SQL Translator 151 (Step 1204). When the SQL Translator 151 receives a new subscription, it needs to consult the Ontology Engine 12 (Step 1205) to rewrite the Subscription SQL. The SQL Translator 151 then deploys the new rewritten SQL statement into the Event Routing Manager 153 (Step 1206). Finally, the Event Routing Manager 153 creates new Event Operators or Event Matching Operators (Step 1207) in order to correlate or match event tuples for delivering events to subscribers.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A semantic publish/subscribe system enabling semantic event routing and which allows publishers to use self-defined event schemas to publish events and subscribers to use self-defined event schemas to subscribe to events comprising:
   an ontology repository for storing object-oriented ontologies;
   an ontology engine accessing said ontology repository in response to queries;
   a set of event publish API (Application Program Interface) that allows an event provider to publish events using self-defined event schema of their own choice;
   event providers who publish events using self-defined event schemas of their own choice using said set of event publish API;
   a set of event subscription API that allows subscribers to subscribe to events using their own self-defined event schema;
   event consumers who subscribe to events using their own self-defined event schemas using said set of subscription API, where the subscriptions can be modeled as SQL (Structured Query Language) statements; and
   an event broker which queries the ontology engine to identify event sources for subscriptions and rewrites SQL statements to bridge semantic differences between published events and information required by subscriptions and, when an event is published, routes the event based on a rewritten SQL statement.

2. The semantic publish/subscribe system recited in claim 1, wherein the ontology engine is operatively coupled with an ontology repository that maintains ontology specifications.

3. The semantic publish/subscribe system recited in claim 1, wherein the ontology engine executes a query from the event broker about semantics.

4. The semantic publish/subscribe system recited in claim 1, wherein the event broker correlates and routes events for subscribers based on semantics.

5. The semantic publish/subscribe system recited in claim 4, wherein the event broker comprises:
- a publish event schema repository that stores all the published event schema for current registered event publishers;
- an event publish manager that maintains the publish event schema repository and checks whether an event tuple's schema is new to the publish event schema repository;
- an SQL translator that rewrites SQL statements to bridge semantic differences between published events and information required by subscriptions;
- a subscription repository that stores all current event subscriptions;
- an event subscription manager the maintains all event subscription in said subscription repository; and
- an event routing manager that generates event operators and event routing operators based on rewritten SQL statements.

6. The semantic publish/subscribe system recited in claim 5, wherein the SQL translator is operatively coupled to the ontology engine, event publish manager and subscription repository to rewrite SQL statements.

7. A method of delivering events based on semantics of published events and event subscriptions, comprising the steps of:
- using by event publishers event publish API (Application Program Interface) to publish events to an event publish manager;
- delivering event schema to the event publish manager and an event tuple into event queues;
- funneling event tuples in the event queues to event operators and event matching operators;
- consulting by the event publish manager a published event schema repository and if a published event schema is new, then funneling the event schema to an SQL translator;
- consulting by the SQL translator an ontology engine when the SQL: translator receives a new event schema, rewrites the subscription statements and deploying rewritten SQL statements into an event routing manager; and
- creating by the event routing manager new event operators or event matching operators in order to correlate or match event tuples for delivering events to subscribers.

8. The method of delivering events based on semantics of published events and event subscriptions recited in claim 7, further comprising the steps of:
- using by event subscribers an event subscription API to subscribe to events from an event subscription manager;
- consulting by the event subscription manager a subscription repository to check whether it is a new subscription and funneling the subscription to the SQL translator;
- consulting by the SQL translator the ontology engine to rewrite a subscription SQL, and then deploying a new rewritten SQL statement into the Event Routing Manager;
- creating by the event routing manager new event operators or event matching operators in order to correlate or match event tuples for delivering events to subscribers.

9. The method of delivering events based on semantics of published events and subscriptions recited in claim 8, wherein the SQL translator rewrites statements comprising the steps of:
- locating an event source;
- replacing a subscription source with a located event source; and
- rewriting predicate in where-clause according to attributes in the located event source and adding correlation conditions.

10. The method of delivering events based on semantics of published events and subscriptions recited in claim 9, wherein the event source is a sufficient event source.

11. The method of delivering events based on semantics of published events and subscriptions recited in claim 9, wherein the event source is a correctable event source.

* * * * *

UNITED STATES PATENT AND TRADEMARK OFFICE
CERTIFICATE OF CORRECTION

| | | |
|---|---|---|
| PATENT NO. | : 7,865,540 B2 | Page 1 of 1 |
| APPLICATION NO. | : 12/061272 | |
| DATED | : January 4, 2011 | |
| INVENTOR(S) | : Hui Lei and Liangzhao Zeng | |

It is certified that error appears in the above-identified patent and that said Letters Patent is hereby corrected as shown below:

In column 1, under the title, add the following:

CROSS-REFERENCE TO RELATED APPLICATION

This application is a continuation of U.S. Patent Application S.N. 10/909,350, filed August 3, 2004 which issued as U.S. Patent 7,756,815 on July 13, 2010, and which is incorporated herein by reference.

Signed and Sealed this
Third Day of July, 2012

David J. Kappos
*Director of the United States Patent and Trademark Office*